(12) United States Patent
Lempitsky et al.

(10) Patent No.: US 11,568,645 B2
(45) Date of Patent: Jan. 31, 2023

(54) ELECTRONIC DEVICE AND CONTROLLING METHOD THEREOF

(71) Applicant: Samsung Electronics Co., Ltd., Suwon-si (KR)

(72) Inventors: Victor Sergeevich Lempitsky, Moscow (RU); Aliaksandra Petrovna Shysheya, Moscow (RU); Egor Olegovich Zakharov, Moscow (RU); Egor Andreevich Burkov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 16/823,752

(22) Filed: Mar. 19, 2020

(65) Prior Publication Data

US 2020/0302184 A1 Sep. 24, 2020

(30) Foreign Application Priority Data

Mar. 21, 2019 (RU) .......................... RU2019108227
Aug. 16, 2019 (RU) .......................... RU2019125940
Jan. 30, 2020 (KR) ........................ 10-2020-0011360

(51) Int. Cl.
*G06V 40/00* (2022.01)
*G06V 20/40* (2022.01)
(Continued)

(52) U.S. Cl.
CPC .............. *G06V 20/46* (2022.01); *G06F 16/70* (2019.01); *G06N 3/08* (2013.01); *G06V 20/41* (2022.01);
(Continued)

(58) Field of Classification Search
CPC .... G06V 20/46; G06V 40/179; G06V 40/168; G06V 40/169; G06V 40/00;
(Continued)

(56) References Cited

U.S. PATENT DOCUMENTS 6,735,566 B1   5/2004 Brand
8,553,037 B2  10/2013 Smith et al.
(Continued)

FOREIGN PATENT DOCUMENTS

CN   101826217   9/2010
CN   102568023   7/2012
(Continued)

OTHER PUBLICATIONS

European Search Report and Written Opinion dated Nov. 29, 2021 in corresponding European Application No. 20773074.8.
(Continued)

*Primary Examiner* — Syed Haider
(74) *Attorney, Agent, or Firm* — Nixon & Vanderhye P.C.

(57) ABSTRACT

An electronic device and a controlling method thereof are provided. A controlling method of an electronic device according to the disclosure includes: performing first learning for a neural network model for acquiring a video sequence including a talking head of a random user based on a plurality of learning video sequences including talking heads of a plurality of users, performing second learning for fine-tuning the neural network model based on at least one image including a talking head of a first user different from the plurality of users and first landmark information included in the at least one image, and acquiring a first video sequence including the talking head of the first user based on the at least one image and pre-stored second landmark information using the neural network model for which the first learning and the second learning were performed.

18 Claims, 6 Drawing Sheets

(51) Int. Cl.
*G06N 3/08* (2006.01)
*G06V 40/16* (2022.01)
*G06F 16/70* (2019.01)

(52) U.S. Cl.
CPC ............ *G06V 40/00* (2022.01); *G06V 40/168* (2022.01); *G06V 40/169* (2022.01); *G06V 40/172* (2022.01); *G06V 40/179* (2022.01); *G06T 2207/10016* (2013.01); *G06T 2207/20081* (2013.01); *G06T 2207/20084* (2013.01); *G06T 2207/30201* (2013.01)

(58) Field of Classification Search
CPC ...... G06V 40/172; G06V 20/41; G06F 16/70; G06N 3/08; G06T 2207/10016; G06T 2207/20084; G06T 2207/30201
See application file for complete search history.

(56) References Cited

U.S. PATENT DOCUMENTS

| | | | |
|---|---|---|---|
| 9,959,368 | B2 | 5/2018 | Kolluru et al. |
| 2006/0192785 | A1 | 8/2006 | Marschner et al. |
| 2009/0296985 | A1 | 12/2009 | Lv et al. |
| 2012/0130717 | A1* | 5/2012 | Xu .................... G06T 13/40 345/473 |
| 2015/0169938 | A1 | 6/2015 | Yao et al. |
| 2016/0180722 | A1 | 6/2016 | Yehezkel et al. |
| 2017/0243387 | A1 | 8/2017 | Li et al. |
| 2018/0174348 | A1 | 6/2018 | Bhat et al. |
| 2019/0341058 | A1* | 11/2019 | Zhang .................. G06V 40/172 |
| 2020/0110971 | A1* | 4/2020 | Csillag .................. G06V 20/52 |

FOREIGN PATENT DOCUMENTS

| | | |
|---|---|---|
| EP | 1510973 | 2/2005 |
| JP | 2000-123192 | 4/2000 |
| KR | 10-2017-0136538 | 12/2017 |
| RU | 2004126185 | 2/2006 |
| WO | 2016/149579 | 9/2016 |

OTHER PUBLICATIONS

Wiles et al., "X2Face: A network for controlling face generation by using images, audio, and pose codes," Visual Geometry Group, University of Oxford, Jul. 27, 2018, XP 055863257.
Pham et al., "Generative Adversarial Talking Head: Bringing Portraits to Life with a Weakly Supervised Neural Network," Department of Computer Science, Rutgers University, Mar. 28, 2018, XP 080861434.
Wang et al., "High-Resolution Image Synthesis and Semantic Manipulation with Conditional GANs," 2018 IEEE/CVF Conference on Computer Vision and Pattern Recognition, XP 033473804.
Isola et al., "Image-to-Image Translation with Conditional Adversarial Networks," Berkeley AI Research (BAIR) Laboratory, UC Berkeley, Nov. 26, 2018, XP 055519711.
Search Report and Written Opinion dated Jul. 13, 2020 in counterpart International Patent Application No. PCT/KR2020/003852.
Decision on Grant dated Feb. 28, 2020 in corresponding Russian Patent Application No. 2019125940 with translation.

* cited by examiner

ELECTRONIC DEVICE AND CONTROLLING METHOD THEREOF

CROSS-REFERENCE TO RELATED APPLICATIONS

This application is based on and claims priority under 35 U.S.C. § 119 to Russian Patent Application No. 2019125940, filed on Aug. 16, 2019, and Russian Patent Application No. 2019108227, filed on Mar. 21, 2019, in the Russian Patent Office of the Russian Federal Service for Intellectual Property (Rospat), and Korean Patent Application No. 10-2020-0011360, filed on Jan. 30, 2020, in the Korean Intellectual Property Office, the disclosures of which are incorporated by reference herein in their entireties.

BACKGROUND

1. Field

The disclosure relates to an electronic device and a controlling method of the electronic device, and for example, to an electronic device capable of acquiring a video sequence including a talking head of a user based on a relatively small number of images, and a controlling method thereof.

2. Description of Related Art

Recently, with the development of the field of artificial intelligence models, technologies related to a talking head model which is capable of generating a video sequence expressing an appearance of a user talking are gaining attention.

As a conventional technology, a technology enabling generation of a video sequence including a talking head by warping a static frame exists, and according to this technology, a video sequence can be acquired only with a small amount of images like one image. However, in the case of a warping-based technology, a limitation that the movement or rotation, etc. of a head cannot be realistically reflected is being pointed out.

As a conventional technology, a technology enabling generation of a video sequence including a talking head using a generative adversarial network (GAN) exists, and according to this technology, a video sequence with a high degree of reality can be acquired. However, in the case of a GAN-based technology up to now, a limitation is being pointed out in that a vast amount of learning data and long hours of learning are required.

Accordingly, there is a need for a technology which uses a relatively small number of images for a user not included in learning data, and enables acquisition of a video sequence including a talking head with a high degree of reality of the user is rising. In particular, there is a great demand for a structure of a neural network model for efficiently and effectively training a neural network model capable of generating a video sequence including a talking head and a learning method of a neural network model.

SUMMARY

Embodiments of the disclosure provide an electronic device which is capable of acquiring a realistic video sequence with a small amount of images including a talking head of a specific user, and a controlling method thereof.

According to an example embodiment of the disclosure, a method of controlling an electronic device includes: performing first learning for a neural network model for acquiring a video sequence including a talking head of a random user based on a plurality of learning video sequences including talking heads of a plurality of users, performing second learning for fine-tuning the neural network model based on at least one image including a talking head of a first user different from the plurality of users and first landmark information included in the at least one image, and acquiring a first video sequence including the talking head of the first user based on the at least one image and pre-stored second landmark information using the neural network model for which the first learning and the second learning were performed.

According to an example embodiment, an electronic device includes: a memory storing at least one instruction and a processor configured to execute the at least one instruction. The processor, by executing the at least one instruction, is configured to: perform first learning for a neural network model for acquiring a video sequence including a talking head of a random user based on a plurality of learning video sequences including talking heads of a plurality of users, perform second learning for fine-tuning the neural network model based on at least one image including a talking head of a first user different from the plurality of users and first landmark information included in the at least one image, and acquire a first video sequence including the talking head of the first user based on the at least one image and pre-stored second landmark information using the neural network model for which the first learning and the second learning were performed.

According to an example embodiment a non-transitory computer readable recording medium having recorded thereon a program which, when executed by a processor of an electronic device, causes the electronic device to perform operations including: performing first learning for a neural network model for acquiring a video sequence including a talking head of a random user based on a plurality of learning video sequences including talking heads of a plurality of users, performing second learning for fine-tuning the neural network model based on at least one image including a talking head of a first user different from the plurality of users and first landmark information included in the at least one image, and acquiring a first video sequence including the talking head of the first user based on the at least one image and pre-stored second landmark information using the neural network model for which the first learning and the second learning were performed.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
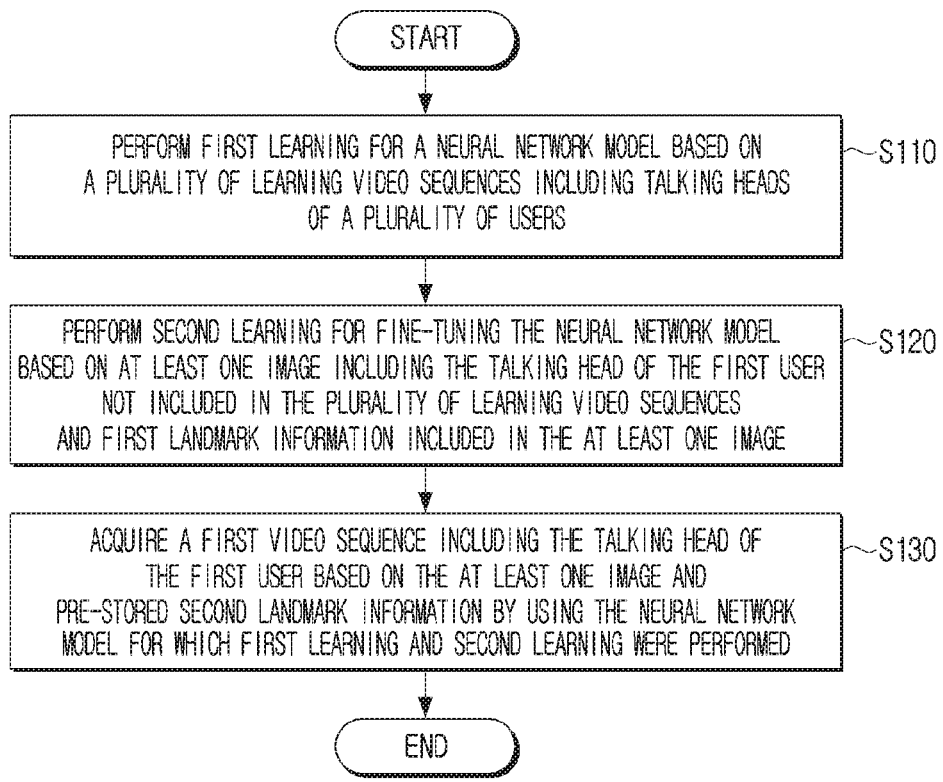
FIG. 1 is a flowchart illustrating and example method of controlling an electronic device according to an embodiment of the disclosure.

Various modifications may be made to the various example embodiments of the disclosure, and there may be various types of embodiments. Accordingly, specific embodiments will be illustrated in drawings, and the embodiments will be described in detail in the disclosure. However, it should be noted that the various embodiments are not intended to limit the scope of the disclosure to a specific embodiment, but they should be understood to include various modifications, equivalents, and/or alternatives of the embodiments of the disclosure. Also, with respect to the description of the drawings, similar components may be designated by similar reference numerals.

In describing the disclosure, in case it is determined that detailed explanation of related known functions or components may unnecessarily confuse the gist of the disclosure, the detailed explanation may be omitted.

In addition, the embodiments below may be modified in various different forms, and the scope of the technical idea of the disclosure is not limited to the example embodiments illustrated below.

The terms used in the disclosure are used to explain specific embodiments of the disclosure, and are not intended to limit the scope of the disclosure. Also, singular expressions include plural expressions, unless the context is clear.

In the disclosure, expressions such as "have," "may have," "include" and "may include" should be understood as denoting that there are such characteristics (e.g.: elements such as numerical values, functions, operations and components), and the expressions are not intended to exclude the existence of additional characteristics.

In the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, expressions such as "first," "second" and the like used in the disclosure may be used to describe various elements regardless of any order and/or degree of importance. Also, such expressions may be used to distinguish one element from another element, and are not intended to limit the elements.

The description in the disclosure that one element (e.g., a first element) is "(operatively or communicatively) coupled with/to" or "connected to" another element (e.g., a second element) should be understood to include both the case where the one element is directly coupled to the another element, and the case where the one element is coupled to the another element through still another element (e.g., a third element).

On the other hand, the description that one element (e.g., a first element) is "directly coupled" or "directly connected" to another element (e.g., a second element), another element (e.g., a third element) does not exist between the one element and the another element.

In addition, the expression "configured to" used in the disclosure may be interchangeably used with other expressions such as "suitable for," "having the capacity to," "designed to," "adapted to," "made to" and "capable of," depending on cases. The term "configured to" may not necessarily refer, for example, to a device being "specifically designed to" in terms of hardware.

Under some circumstances, the expression "a device configured to" may refer, for example, to the device being "capable of" performing an operation together with another device or component. For example, the phrase "a processor configured to perform A, B and C" may refer, for example, to a dedicated processor (e.g.: an embedded processor) for performing the corresponding operations, or a generic-purpose processor (e.g.: a CPU or an application processor) that can perform the corresponding operations by executing one or more software programs stored in a memory device. However, the disclosure is not limited thereto.

In the embodiments of the disclosure, 'a module' or 'a part' performs at least one function or operation, and these elements may be implemented as hardware or software, or as a combination of hardware and software. Further, a plurality of 'modules' or 'parts' may be integrated into at least one module and implemented as at least one processor (not shown), except 'modules' or 'parts' that need to be implemented as specific hardware.

Various elements and areas in drawings may be illustrated schematically. Accordingly, the technical idea of the disclosure is not limited by the relative sizes or intervals drawn in the accompanying drawings.

Hereinafter, various example embodiments according to the disclosure will be described in greater detail with reference to the accompanying drawings.

FIG. 1 is a flowchart illustrating an example method of controlling an electronic device according to an embodiment of the disclosure.

The electronic device according to the disclosure may acquire a video sequence including a talking head of a user using a neural network model. A neural network model may refer, for example, to an artificial intelligence model including an artificial neural network, and accordingly, the term neural network model may be used interchangeably with the term artificial intelligence model. For example, a neural network model may be a generative adversarial network (GAN) model including an embedder, a generator, and a discriminator, and may be configured to acquire a video sequence including a talking head of a random user. A talking head may refer, for example, to a head portion expressing the appearance of a user talking.

Referring to FIG. 1, the electronic device may perform first learning for a neural network model according to the disclosure. For example, the electronic device may perform first learning for a neural network model for acquiring a video sequence including a talking head of a random user based on a plurality of learning video sequences including talking heads of a plurality of users at operation S110.

The first learning may be performed using, for example, a meta-learning method. Meta-learning may refer, for example, to a method of automating a machine learning process and thereby making a machine learn learning rules (meta knowledge) by itself. For example, meta-learning may refer, for example, to learning a learning method. For the first learning, a plurality of learning video sequences including talking heads of a plurality of users are used, and a learning video sequence is for referring to a video sequence used for the first learning.

For example, the first learning according to the disclosure may be performed through a process of performing a training task in a similar form to the second learning that will be described below, and learning generalized rules for acquiring a video sequence including a talking head of a random user. As the first learning process is performed, input and output values of each of the embedder, the generator, and the discriminator according to the disclosure and a plurality of parameters, etc. may be learned, and based on these, the neural network model may acquire a video sequence including a talking head of a random user. The first learning will be described in greater detail below with reference to FIGS. 3 and 4.

The electronic device may perform second learning for the neural network model according to the disclosure. For example, the electronic device may perform second learning based on at least one image including a talking head of a user not included in the aforementioned plurality of learning video sequences (hereinafter, referred to as a first user). For example, the electronic device may perform second learning for fine-tuning the neural network model based on at least one image including the talking head of the first user (not included in the plurality of learning video sequences) and first landmark information included in the at least one image at operation S120.

The second learning may be performed using, for example, a few-shot learning method. Few-shot learning may refer, for example, to a method for effectively training a neural network model with a small amount of data. For the second learning, first landmark information may be used, and landmark information may refer, for example, to information regarding the main characteristics of the face of the user included in an image, and the first landmark information may refer to landmark information included in at least one image including the talking head of the first user.

For example, the second learning according to the disclosure may include a process of, after generalized rules for acquiring a video sequence including a talking head of a random user are learned through the aforementioned first learning, fine-tuning the neural network model to be personalized for the first user based on at least one image including the talking head of the first user. As the second learning is performed, a parameter set of the generator according to the disclosure may be fine-tuned to be matched with the at least one image including the talking head of the first user, and based on this, the neural network model may acquire a video sequence including the talking head of the first user. The second learning will be described in greater detail below with reference to FIGS. 2 and 4.

When the first learning and the second learning are performed as described above, the electronic device may acquire a first video sequence including the talking head of the first user based on at least one image and pre-stored second landmark information using the neural network model for which the first learning and the second learning were performed at operation S130.

For example, the electronic device may input at least one image and the first landmark information into an embedder in which the first learning was performed, and acquire a first embedding vector. The first embedding vector may, for example, be a vector of an $N^{th}$ dimension acquired by an embedder, and may include information regarding the identity of the first user. When the first embedding vector is acquired, the electronic device may input the first embedding vector and pre-stored second landmark information into the generator, and acquire a first video sequence including the talking head of the first user. The second landmark information may, for example, be landmark information acquired from a plurality of images included in a plurality of learning video sequences and stored in advance.

Ultimately, the electronic device according to the disclosure may, for example, perform first learning according to a meta-learning method based on a plurality of learning video sequences and thereby make the neural network model acquire a video sequence including a talking head of a random user, and perform second learning according to a few-shot learning method based on at least one image for the first user who is a new user not included in the plurality of learning video sequences and thereby fine-tune the neural network model to be personalized for the first user, and acquire a video sequence including the talking head of the first user using the neural network model for which the first learning and the second learning were performed.

According to the various example embodiments of the disclosure, the electronic device may efficiently and effectively train a neural network model capable of generating a video sequence including a talking head, and in accordance therewith, use a relatively small amount of images of a user not included in learning data, and acquire a video sequence including a talking head with a high degree of reality of the user.

Hereinafter, the first learning process, the second learning process, and the process of acquiring a video sequence according to the various example embodiments of the disclosure will be described in greater detail.

Figure 2:
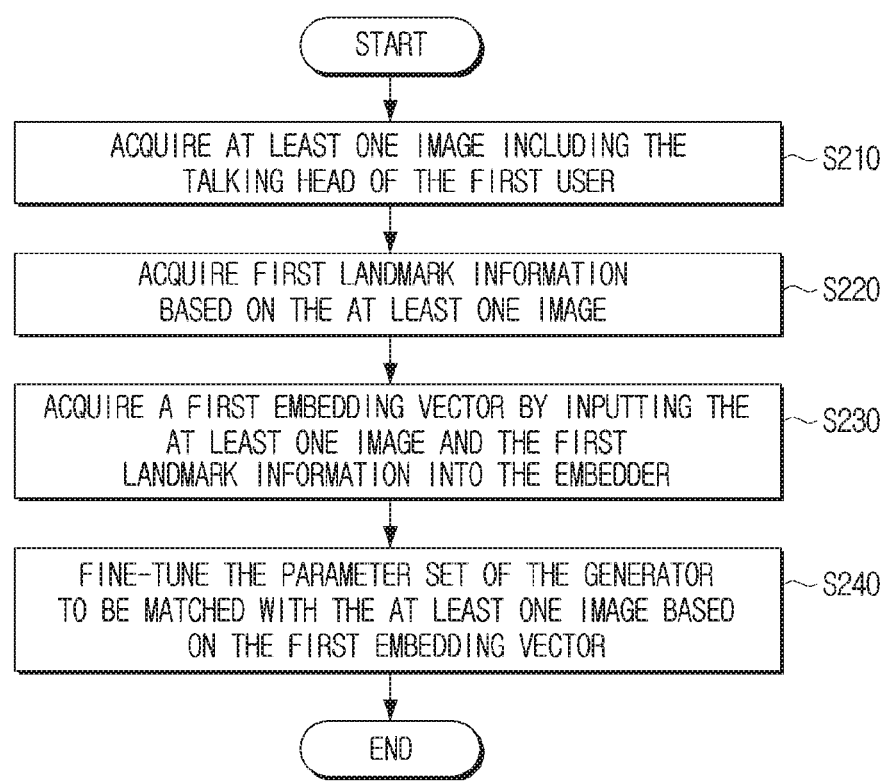
FIG. 2 is a flowchart illustrating an example second learning process according to an embodiment of the disclosure.

FIG. 2 is a flowchart illustrating an example second learning process according to an embodiment of the disclosure.

A plurality of operations included in the second learning step S120 discussed above with reference to FIG. 1 will be explained in greater detail. As described above, the second learning process according to the disclosure may be performed through a few-shot learning method, and may refer, for example, to a process for acquiring a video sequence including a talking head of a user not included in a learning video sequence of the first learning process. As described above, the first learning is performed before the second learning process is performed. However, hereinafter, to explain the main characteristics according to the disclosure in greater detail, the second learning process will be explained first, and then the first learning process will be explained.

As illustrated in FIG. 2, the electronic device according to the disclosure may acquire at least one image including the talking head of the first user at operation S210. The at least one image may, for example, be from 1 to 32 images. This merely refers to the second learning according to the disclosure being performed using a small amount of images, and the number of images used for the second learning according to the disclosure is not limited thereto. Even if the second learning is performed based on one image, a video sequence including the talking head of the first user may be acquired. As the number of images used for the second learning increases, the degree of personalization for the first user may increase.

When at least one image is acquired, the electronic device may acquire first landmark information based on the at least one image at operation S220. For example, landmark information may include information on a head pose included in an image and information on a mimics descriptor, and may include various kinds of information related to various characteristics included in a talking head in addition to them. According to an embodiment of the disclosure, a landmark may be rasterized into a facial landmark image of a 3-channel using, for example, a pre-defined color set to connect a specific landmark with a line segment.

When the first landmark information is acquired, the electronic device may input at least one image and the first landmark information into an embedder in which the first learning was performed, and acquire a first embedding vector including information regarding the identity of the first user at operation S230. For example, the first embedding vector may include information on the unique characteristics of the first user included in the talking head of the first user, but may be independent regarding the head pose of the first user. In the second learning process, the electronic device may acquire a first embedding vector for the first user based on the parameter of the embedder acquired in the first learning.

When the first embedding vector is acquired, the electronic device may fine-tune the parameter set of the generator to be matched with at least one image including the talking head of the first user based on the first embedding vector at operation S240. The feature that the parameter set of the generator is fine-tuned may refer, for example, to the generator and the neural network model including the generator being fine-tuned, and this may refer, for example, to the generator being optimized to correspond to the first user.

For example, a fine-tuning process may include a process of instantiating the generator based on the parameter set of the generator and the first embedding vector. Instantiation may be performed, for example, through a method such as Adaptive Instance Normalization (AdaIN).

For example, in the second learning, the neural network model according to the disclosure may learn not only person-generic parameters related to characteristics generalized for a plurality of users, but may also learn person-specific parameters.

A more detailed second learning method, for example, a detailed method of few-shot learning for fine-tuning the neural network model according to the disclosure will be described in greater detail below with reference to FIG. 4.

Figure 3:
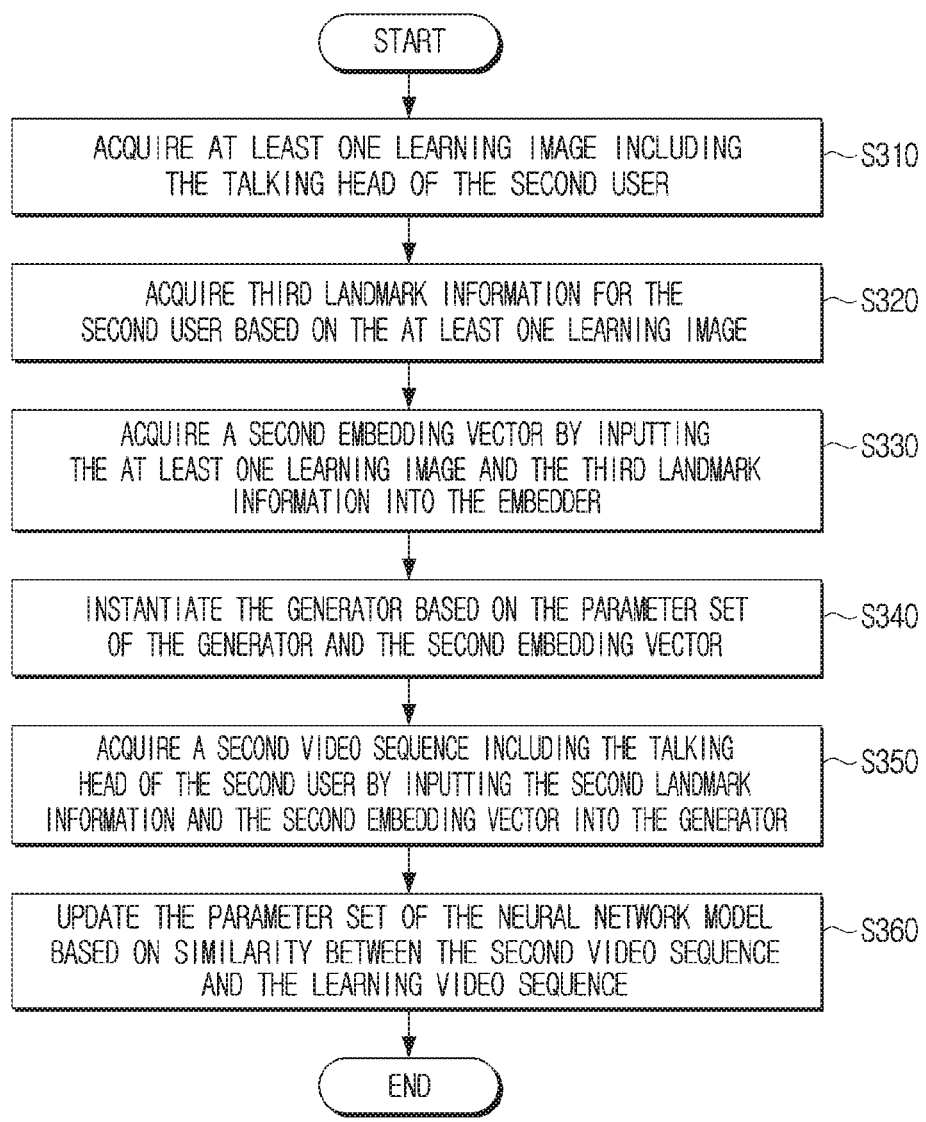
FIG. 3 is a flowchart illustrating an example first learning process according to an embodiment of the disclosure.

FIG. 3 is a flowchart illustrating an example first learning process according to an embodiment of the disclosure.

Hereinafter, a plurality of operations included in the first learning step S110 explained with reference to FIG. 1 will be explained in greater detail. As described above, the first learning process according to the disclosure may be performed through a meta-learning method, and may refer, for example, to a process for acquiring a video sequence including a talking head of a random user based on a plurality of learning video sequences including talking heads of a plurality of users. As will be described in greater detail below, in the first learning process, the plurality of parameters of the neural network model may be learned by an adversarial method.

As illustrated in FIG. 3, the electronic device according to the disclosure may acquire at least one learning image from a learning video sequence including the talking head of the second user among a plurality of learning video sequences at operation S310. For example, the first learning may be performed through a K-shot learning method, which may refer, for example, to a method of performing learning by acquiring random image frames in a K number from one learning video sequence among a plurality of learning video sequences. The second user may refer, for example, to a specific user among a plurality of users included in a plurality of learning video sequences, and may be distinguished from the term first user for referring to a user not included in a plurality of learning video sequences.

When at least one learning image is acquired from a learning video sequence including the talking head of the second user, the electronic device may acquire third landmark information for the second user based on the acquired at least one learning image at operation S320. The third landmark information may refer, for example, to landmark information included in the at least one image including the talking head of the second user. For example, the third landmark information may include the same information as the first landmark information in that it is information regarding the main characteristics of the face of a specific user included in an image, but is different from the first landmark information in that it is landmark information for the second user, not the first user.

When the third landmark information is acquired, the electronic device may input the at least one learning image acquired from the learning video sequence including the talking head of the second user and the third landmark information into an embedder, and acquire a second embedding vector including information regarding the identity of the second user at operation S330. The second embedding vector may refer, for example, to a vector of an $N^{th}$ dimension acquired by an embedder, and may include information regarding the identity of the second user. For example, the second embedding vector may refer, for example, to specifying the vector by distinguishing it from the first embedding vector including information regarding the identity of the first user. For example, the second embedding vector may be the result of averaging embedding vectors acquired from a randomly sampled image (e.g., a frame) from a learning video sequence.

When the second embedding vector is acquired, the electronic device may instantiate the generator based on the parameter set of the generator and the second embedding vector at operation S340. When the generator is instantiated, the electronic device may input the third landmark information and the second embedding vector into the generator and acquire a second video sequence including the talking head of the second user at operation S350. The parameters of the embedder and the parameters of the generator may be optimized to minimize and/or reduce an objective function including, for example, a content loss term, an adversarial term, and an embedding match term that will be described in greater detail below.

When the second video sequence is acquired, the electronic device may update the parameter set of the generator and the parameter set of the embedder based on the degree of similarity between the second video sequence and the learning video sequence at operation S360. For example, the electronic device may acquire a realism score for the second video sequence through the discriminator, and update the parameter set of the generator, the parameter set of the embedder, and the parameter set of the discriminator based on the acquired realism score. For example, the parameter set of the discriminator may be updated for increasing the realism score for the learning video sequence, and decreasing the realism score for the second video sequence.

The discriminator may, for example, be a projection discriminator acquiring a realism score based on a third embedding vector different from the first embedding vector and the second embedding vector. The third embedding vector may, for example, be a vector of an $N^{th}$ dimension acquired by the discriminator, and may be distinguished from the first embedding vector and the second embedding vector acquired by the embedder. For example, the third embedding vector may correspond to each of the at least one image including the talking head of the second user, and may include information related to the realism score for the second video sequence. While the first learning step is performed, the difference between the second embedding vector and the third embedding vector may be penalized, and the third embedding vector may be initialized based on the first embedding vector at the start of the second learning step. In other words, while the first learning step is performed, the second embedding vector and the third embedding vector may be learned to be similar to each other. Also, at the start of the second learning step, the third embedding vector may be used while being initialized based on the first embedding vector including information related to the identity of the first user not used in learning of the first learning step.

A more detailed first learning method, for example, a detailed method for performing meta-learning for the neural network model according to the disclosure will be described in greater detail below with reference to FIG. 4.

Figure 4:
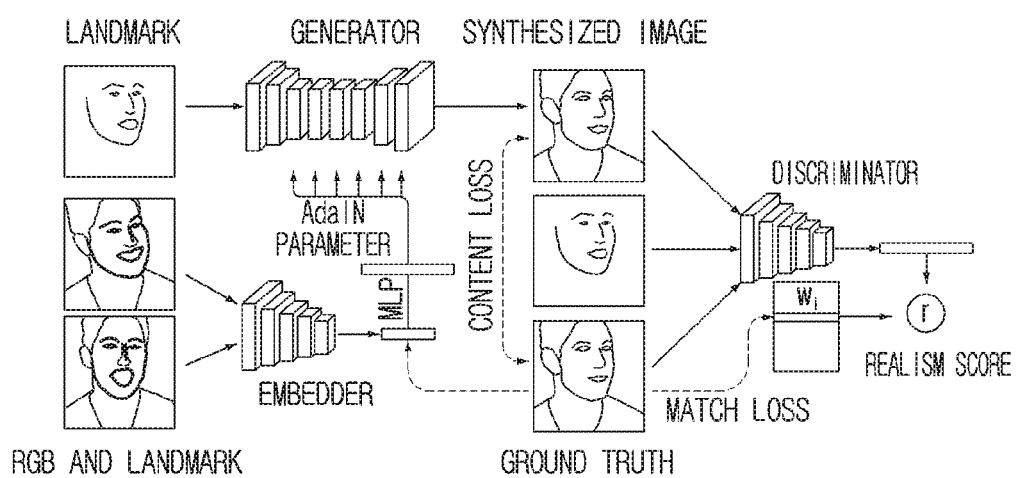
FIG. 4 is a diagram illustrating an example architecture of an example neural network model and example operations performed through an embedder, a generator, and a discriminator according to an embodiment of the disclosure.

FIG. 4 is a diagram illustrating an example architecture of a neural network model and example operations performed through an embedder, a generator, and a discriminator according to an embodiment of the disclosure.

Hereinafter, before explaining the disclosure in greater detail, several conventional technologies related to the disclosure will be explained, and the neural network model according to the disclosure for overcoming the limitation of the conventional technologies will be explained. In explaining the neural network model, the architecture of the neural network model, and a method for implementing the various embodiments according to the disclosure through the neural network model will be explained in greater detail.

The disclosure relates to a method for synthesizing a talking head model which has a high degree of reality (photorealistic) and is personalized, e.g., a video sequence with a high degree of reality regarding voice expressions and imitations of a specific person. For example, the disclosure relates to a method for synthesizing a head image which has a high degree of reality and is personalized when a set of face landmarks operating animation of a model is given. Such a method has practical application for telepresence including not only video conferences and multi-player games but also the special effects industry.

Synthesizing a talking head sequence with a high degree of reality is known to be difficult for two reasons. First, a human head has high photometric, geometric, and dynamic complexity. Such complexity may occur not only in face modeling wherein a great number of modeling access methods exist but also in oral, hair, and clothing modeling. A second reason for complexity is acuteness of a human vision system for a slight mistake that may occur in exterior modeling of a human head (a so-called uncanny valley effect, [Reference 24], hereinafter, the list of references referred to in explaining the disclosure will be set forth below the explanation regarding FIG. 6). As tolerance toward a modeling mistake is low as described above, that is, as a human visual system is very acute, if a talking head sequence has even a slight difference from the actual face of a human talking, a user may feel a great sense of repulsion, and in this case, using an unrealistic avatar may rather give a more favorable impression to the user. Accordingly, in many of the current teleconference systems, avatars like unrealistic cartoons are being used.

As conventional technologies for overcoming the aforementioned task, there are some methods for synthesizing a connected head sequence by warping a single or a plurality of static frames. All warping fields synthesized using a traditional warping algorithm [References 5, 28] and machine learning (including deep learning) [References 11, 29, 40] may be used for such a purpose. A warping-based system may generate a talking head sequence from a small amount of images such as one image, but has a limitation in processing disocclusion, the amount of operations, the rotation of the head, etc. without artificial processing.

As a conventional technology, there is a method of directly (warping-free) synthesizing a video frame using an adversarially-trained deep convolutional network (ConvNet) [References 16, 20, 37]. However, for such a method to succeed, a grand-scale network wherein each of generators and discriminators has tens of millions of parameters for a talking head should be trained. Accordingly, for generating a newly personalized talking head model according to such a system, not only a gigantic data set of videos in a length of a few minutes [References 20, 37] or photographs [Reference 16] but also a few hours of GPU training is needed. It can be said that such training data and training time are excessive to be applied to most actual telepresence scenarios for which it is required to let a user generate a personalized head model with as little effort as possible, though such a requirement is less than what is needed for a system constructing a head model with a high degree of reality using elaborate physical and optical modeling [Reference 1].

As a conventional technology, there is a method of statistically modelling the exterior of a human face [Reference 6], and specifically, there is a method using a classical technology [Reference 35], and more recently, there is a method of using deep learning [References 22, 25]. Face modeling has high relevance with talking head modeling, but talking head modeling includes modeling the hair, neck, oral cavity and often non-facial parts such as the shoulder/top, and thus face modeling and talking head modeling are not identical. Such a non-facial part cannot be processed by simply extending a face modeling method, and this is because a non-facial part is much less appropriate in registration and often has higher variability and complexity than facial parts. In principle, the result of face modeling [Reference 35] or lip modeling [Reference 31] may be stitched to a head video. However, in the case of following such a method, rotation of the head cannot be completely controlled in the final video, and thus a genuine talking head system cannot be provided.

If model-agnostic meta-learning (MAML) [Reference 10] which is a conventional technology is used, the initial status of an image classifier is acquired using meta-learning, and based on this, in case there are few training samples, the image classifier can be swiftly converged to an image classifier of unseen classes. Such a method can be used by the method according to the disclosure, although it is different in its implementation. Meanwhile, various methods for combining adversarial training and meta-learning exist. Data-augmentation GAN [Reference 3], meta-GAN [Reference 43], and adversarial meta-learning [Reference 41] may generate additional images for unseen classes in a meta-learning step using an adversarially-trained network. Such methods are mainly focused on improving the few-shot classification performance, but the method according to the disclosure deals with training of an image generation model using an adversarial purpose. To sum up, in the disclosure, adversarial fine-tuning may be introduced into a meta-learning framework. Fine-tuning may be applied after the initial status of the generator and a discriminator network may be acquired through a meta-learning step.

As conventional technologies, there are recent two methods related to text-to-speech generation [References 4, 18].

Their settings (few-shot learning of a generation model) and some components (an independent embedder network, fine-tuning of a generator) may also be used in the disclosure. Nevertheless, the disclosure is different from conventional technologies at least in its application areas, use of adversarial learning, specific application to a meta-learning process, and details of various implementations.

According to the disclosure, a method for generating a talking head model from a few photographs (so-called few-shot learning) is provided. The method according to the disclosure may generate a reasonable result with a single photograph (one-shot learning), but the degree of personalization can be further heightened if a few photographs are added. In a similar manner to References 16, 20, and 37, a talking head generated by a neural network model according to the disclosure may be generated through a deep ConvNet which synthesizes a video frame in a direct manner by a series of convolution operations rather than warping. Accordingly, a talking head generated according to the disclosure may process big transformation in a pose exceeding the ability of a warping-based system.

Few-shot learning ability may be acquired through pre-training (meta-learning) in a wide range for a large corpus of a talking head video corresponding to a plurality of users different from one another having various exteriors. In a meta-learning process according to the disclosure, the method according to the disclosure may learn simulating a few-shot learning task, and converging a landmark location to a photograph which has a high degree of reality and is personalized based on a small amount of training sets. Afterwards, a small amount of images for a new user may set a new adversarial learning problem for a discriminator trained in advance through a high capacity generator and meta-learning. A new adversarial learning problem may be converged to a state of generating an image which has a high degree of reality and is personalized after some training steps.

The architecture of a neural network model according to the disclosure may be implemented using at least some of results according to recent development of generation modeling of images. For example, the architecture according to the disclosure may use adversarial training [Reference 12], and for example, a method for a conditional discriminator [Reference 23] including a projection discriminator [Reference 32]. A meta-learning step may use, for example, an Adaptive Instance Normalization (AdaIN) mechanism [Reference 14] shown to be useful for a grand-scale conditional generation task [References 2, 34]. Thus, according to the disclosure, the quality of a synthesized image can be improved, and an uncanny valley effect can be removed and/or reduced from a synthesized image.

The meta-learning step according to the disclosure may assume availability of video sequences (e.g., learning video sequences) in an M number including talking heads of a plurality of users different from one another. $x_i$ indicates the $i^{th}$ video sequence, and $x_i(t)$ indicates the $t^{th}$ video frame of the video sequence. Not only during meta-learning but also during the test time, it may be assumed that the location of a face landmark is available for all frames (for example, a standard face alignment code [Reference 7] may be used to obtain the location of a face landmark). A landmark may be rasterized into a 3-channel image (e.g., a face landmark image) using a pre-defined color set to connect a specific landmark with a line segment. $y_i(t)$ indicates a resulting face landmark image computed with respect to $x_i(t)$.

As illustrated in FIG. 4, the meta-learning architecture according to the disclosure may include an embedder network mapping a head image (having an estimated face landmark) to an embedding vector including pose-independent information, and a generator network mapping an input face landmark to an output frame through a set of convolution layers modulated by an embedding vector through Adaptive Instance Normalization (AdaIN). In general, during a meta-learning step, a frame set acquired from the same video may pass through an embedder network, and resulting embedding may be averaged and used for predicting adaptive parameters of a generator network. Afterwards, an image that was generated after the landmark of another frame passed through the generator network may be compared with ground truth. An objective function may include a perceptual loss and an adversarial loss. An adversarial loss may be implemented through a conditional projection discriminator network. The meta-learning architecture according to the disclosure and operations corresponding thereto will be described in greater detail below.

In the meta-learning operation according to the disclosure, the following three networks (generally referred to as adversarial networks or generative adversarial networks (GANs)) may be trained (refer to FIG. 4).

1. The embedder $E(x_i(s), y_i(s); \phi)$. The embedder may be configured to) acquire a video frame $x_i(s)$, and an associated face landmark image $y_i(s)$, and map these inputs to an embedding N-dimension vector $\hat{e}_i(s)$. The video frame $x_i(s)$ may be acquired from learning video sequences, that is, a plurality of learning video sequences wherein a talking head model includes talking head images of a plurality of users different from a random user that will be synthesized in the future. $\phi$ indicates an embedder parameter learned during the meta-learning step. In general, the purpose of the meta-learning step for the embedder E is learning $\phi$ such that the embedding N-dimension vector $\hat{e}_i(s)$ includes video-specific information which is invariable to poses and mimics in a specific frame s (such as the identity of a human) The embedding N-dimension vector computed by the embedder is transcribed as $\hat{e}_i$.

2. The generator $G(y_i(t), \hat{e}_i; \psi, P)$. The generator may be configured to acquire an unseen video frame $x_i(t)$ and a face landmark image $y_i(t)$ for the embedding N-dimension vector $\hat{e}_i(t)$ computed to correspond thereto by the embedder E, and generate a synthesized video frame $\hat{x}_i(t)$. The generator G may be trained to maximize and/or increase the similarity between output (e.g., the synthesized video frame $\hat{x}_i$) and a corresponding ground truth frame. Parameters of the generator G may be divided into two sets, e.g., person-generic parameters $\psi$ and person-specific parameters $\hat{\psi}_i$. During the meta-learning step, while person-generic parameters $\psi$ are directly trained, person-specific parameters $\hat{\psi}_i$ may be predicted from the embedding N-dimension vector $\hat{e}_i$ during the fine-tuning step (described in greater detail below) of meta-learning using a trainable projection matrix $p: \hat{\psi}_i = P\hat{e}_i$.

3. The discriminator $D(x_i(t), y_i(t); i\theta, w, w_0, B)$. The discriminator may be configured to acquire an input video frame $x_i(t)$, an associated face landmark image, $y_i(t)$, and an index i of a learning video sequence, and compute a realism score r (a single scalar). $\theta$, W, $w_0$, b indicates a discriminator parameter learned during the meta-learning step. The discriminator may include a convolutional network (ConvNet) part $V(x_i(t), y_i(t): \theta)$ configured to map the input video frames $x_i(t)$ and the associated face landmark image $y_i(t)$ to an N-dimension vector. Afterwards, the realism score r may be computed by the discriminator based on the N-dimension vector and the discriminator parameter W, $w_0$, b. The realism score r indicates whether the input video frame $x_i(t)$ is the actual (e.g., not synthesized) video frame of the $i^{th}$ learning video sequence and whether the input video frame $x_i(t)$ is matched with the associated face landmark image $y_i(t)$. The video frame $x_i(t)$ input into the discriminator may be a synthesized video frame $\hat{x}_i(t)$, but the fact that the input video frame $\hat{x}_i(t)$ is a synthesized video frame is not known to the discriminator.

During the meta-learning operation of the example method, parameters of all three networks may be trained by an adversarial method. This may be performed by simulating the episodes of K-shot learning. K may, for example, be 8, but is not limited thereto, and K may be selected to be bigger or smaller than 8 according to the performance of the hardware used in the meta-learning step or the accuracy of an image generated by a meta-learned GAN and the purpose of meta-learning of such a GAN. In each episode, a learning video sequence i and a single ground truth video frame $x_i(t)$ the sequence may be randomly extracted. In addition to $x_i(t)$, additional video frames in a K number $s_1, s_2, \ldots, s_K$ may be extracted from the same learning video sequence i. Afterwards, at the embedder E, the embedding N-dimension vector $\hat{e}_i(s_K)$ computed with respect to the additional video frames in a K number may be averaged, and accordingly, the embedding N-dimension vector $\hat{e}_i$ may be computed with respect to the learning video sequence i:

$$\hat{e}_i = \frac{1}{K}\sum_{k=1}^{K} E(x_i(s_K), y_i(s_K); \phi) \quad (1)$$

At the generator G, a video framer $\hat{x}_i(t)$ synthesized based on the computed embedding N-dimension vector $\hat{e}_i$ (e.g., reconstruction of the $t^{th}$ frame) may be computed:

$$\hat{x}_i(t)=G(x_i(t),\hat{e}_i;\omega,P) \quad (2)$$

The parameters of the embedder E and the generator G may be optimized to minimize and/or reduce an objective function including a content loss term $\mathcal{L}_{CNT}$, an adversarial term $\mathcal{L}_{ADV}$, and an embedding match term $\mathcal{L}_{MCH}$:

$$\mathcal{L}(\phi,\psi,P\theta,W,w_0,b)=\mathcal{L}_{CNT}(\phi,\psi,P)+\mathcal{L}_{ADV}(\phi,\psi,P\theta,W,w_0,b)+\mathcal{L}_{MCH}(\phi,W) \quad (3)$$

In the formula (3), the content loss term $\mathcal{L}_{CNT}$ may measure the distance between the ground truth video frame $x_i(t)$ and the synthesized video frame $\hat{x}_i(t)$ using perceptual similarity measure [Reference 19]. As an example, perceptual similarity measure corresponding to a VGG19 [Reference 30] network trained with respect to the ILSVRC classification and a VGGFace [Reference 27] network trained for verification of faces may be used. However, any perceptual similarity measure known from conventional technologies may be used in the disclosure, and accordingly, the disclosure is not limited to the aforementioned example. In case the VGG19 and VGGFace networks are used as perceptual similarity measure, the content loss term $\mathcal{L}_{CNT}$ may be calculated as the weighted sum of $L_1$ losses among the features of the networks.

The adversarial term $\mathcal{L}_{ADV}$ in the formula (3) may correspond to a realism score r computed by the discriminator D which needs to be maximized and/or increased and a feature matching term [Reference 38] $\mathcal{L}_{FM}$ which is inherently perceptual similarity measure computed using the discriminator (this may improve the stability of meta-learning):

$$\mathcal{L}_{ADV}(\phi,\psi,P,\theta,W,w_0,b)=-D(\hat{x}_i(t),y_i(t),i;\theta,W,w_0,b)+\mathcal{L}_{FM} \quad (4)$$

According to a projection discriminator access method [Reference 32], a column of a matrix W may include an embedding N-dimension vector corresponding to an individual video. The discriminator D may first input (e.g., an input video frame $x_i(t)$, an associated face landmark image $y_i(t)$, and an index i of a learning video sequence) to an N-dimension vector $V(x_i(t), y_i(t); \theta)$ and compute a realism score r as follows:

$$D(x_i(t),y_i(t);i;\theta W,w_0,b)=V(\hat{x}_i(t),y_i(t);\theta)^T(W_i+w_0)+b \quad (5)$$

Here, $w_i$ indicates the $i^{th}$ column of the matrix W. At the same time, as $w_0$ and b are not dependent on a video index, such terms may correspond to the general degree of reality of $\hat{x}_i(t)$ and the compatibility with the face landmark image $y_i(t)$.

Accordingly, in the method according to the disclosure, two types of embedding N-dimension vectors, e.g., a vector computed by the embedder E and a vector corresponding to a column of the matrix W at the discriminator D may exist. The matching term $\mathcal{L}_{MCH}(\phi, W)$ in the above formula (3) may penalize the $L_1$-difference between $\hat{e}_i$ and $W_i$ and promote the similarity of the two types of embedding N-dimension vectors.

As the parameter $\phi$ of the embedder E and the parameter $\psi$ of the generator G are updated, the parameter $\theta$, W, $w_0$, b of the discriminator D may also be updated. Update may be driven by minimization and/or reduction of a hinge loss objective function (6) as follows, and this may promote increase of a realism score r for an actual (e.g., not fake) video frame $x_i(t)$ and decrease of a synthesized (e.g., fake) video frame (t) $\hat{x}_i(t)$:

$$\mathcal{L}_{DSC}(\phi,\omega,P,\theta,W,w_0,b)=\max(0,1+D(\hat{x}_i(t),y_i(t),t,\phi,\psi,\theta,W,w_0,b))+\max(0,1-D(x_i(t),y_i(t),i;\theta,W,w_0,b)) \quad (6)$$

Thus, according to the formula (6), the neural network model according to the disclosure may compare the degrees of reality of the fake example $\hat{x}_i(t)$ and the actual example $x_i(t)$, and update the discriminator parameter and thereby make the scores smaller than $-1$ and greater than $+1$, respectively. Meta-learning may proceed by alternately performing update of the embedder E and the generator G minimizing the losses $\mathcal{L}_{CNT}$, $\mathcal{L}_{ADV}$ and $\mathcal{L}_{MCH}$, and update of the discriminator D minimizing the loss $\mathcal{L}_{DSC}$.

When meta-learning is converged, the neural network model according to the disclosure may be additionally trained to synthesize a talking head model for an unseen new user during the meta-learning operation. Synthesis may be conditioned on a face landmark image. The neural network model according to the disclosure may be trained by a few-shot method while being assumed as a face landmark image for which training images in a T number $x(1), x(2), \ldots, x(T)$ (e.g., frames in a T number of the same video) are provided and to which $y(1), y(2), \ldots, y(T)$ correspond. Here, the number of frames T does not have to be the same as K used in the meta-learning step. The neural network model according to the disclosure may generate a reasonable result on the basis of a single photograph (one-shot learning, T=1), and if a few more photographs are added (few-shot learning, T>1), the degree of personalization can be further increased. For example, T may cover a range of, for example, from 1 to 32. However, the disclosure is not limited thereto, and T may be selected in various ways according to the performance of the hardware used for few-shot learning, the accuracy of an image generated by a GAN few-shot learned after being meta-learned, and the purpose of few-shot learning (e.g., fine-tuning) of the meta-learned GAN.

The meta-learned embedder E may be used in computing an embedding N-dimension vector $\hat{e}_{NEW}$ for a new person to which a talking head will be synthesized in few-shot learning. For example, calculation of $\hat{e}_{NEW}$ may be performed according to the following:

$$\hat{e}_{NEW} = \frac{1}{T}\sum_{t=1}^{T} E(x(t), y(t); (\phi) \quad (7)$$

In the meta-learning step, the parameter φ of the embedder E acquired previously may be re-used. A simple method of generating a new synthesized frame in response to a new landmark image is applying the generator G using not only the projection matrix P but also the computed embedding N-dimension vector $\hat{e}_{NEW}$ and the meta-learned parameter ψ of the generator G. However, in this case, it was found that, although a synthesized talking head image looks plausible and is realistic, a great amount of identity gaps to an unacceptable degree exist for most applications aimed at synthesis of a personalized talking head image.

Such identity gaps may be overcome through the fine-tuning process according to the disclosure. The fine-tuning process may appear to be a simplified version of meta-learning which is performed on the basis of a single video sequence and frames in a fewer number. for example, the fine-tuning process may include the following components:

1. The generator $G(y_i(t), \hat{e}_{NEW}; \psi, P)$ may now be replaced by the generator $G'(y(t); \psi, \psi')$. As in the meta-learning step, the generator G' may be configured to acquire a face landmark image y(t) and generate a synthesized video frame $\hat{x}(t)$ Importantly, a person-specific generator parameter currently transcribed as ψ' may be directly optimized in the few-shot learning step together with the person-generic parameter ψ. The embedding N-dimension vector $\hat{e}_{NEW}$ and the projection matrix P acquired in the meta-learning step may still be used in initializing the person-specific generator parameter ψ' (e.g., $\psi' = P\hat{e}_{NEW}$).

2. In the meta-learning operation, the discriminator D'(x(t), y(t); θ, w', b) may be configured to compute a realism score r as before. The parameter θ and the bias b of the ConvNet part v(x(t), y(t); θ) of the discriminator D' may be initialized to the same parameter θ and b acquired in the meta-learning step. Initialization w' will be explained below.

During the fine-tuning step, the realism score r of the discriminator D' may be acquired in a similar manner to the meta-learning step:

$$D'(\hat{x}(t), y(t); \theta, w', b) = V(\hat{x}(t), y(t); \theta)^T w' + b \quad (8)$$

As can be seen from the comparison of the formulae (5) and (8), the role of the vector w' in the fine-tuning step may be the same as the role of the vectors $W_i + w_0$ in the meta-learning step. In the initialization process of w' in the few-shot learning step, the analog of $W_i$ cannot be used for a new person. This is because the video frame of the new person was not used in the meta-learning training data set. However, the matching term $\mathcal{L}_{MCH}$ in the meta-learning process may ensure similarity between the embedding N-dimension vector of the discriminator and the embedding N-dimension vector computed by the embedder. Accordingly, w' may be initialized as the sum of $w_0$ and $\hat{e}_{NEW}$ in the few-shot learning step.

When a new learning problem is set, the loss function of the fine-tuning step may be directly derived from a meta-learning variable. Accordingly, the person-specific parameter ψ' and the person-generic parameter ψ of the generator G' may be optimized to minimize the following simplified objective function:

$$\mathcal{L}'(\psi, \psi', \theta, w', b) = \mathcal{L}'_{CNT}(\psi, \psi') + \mathcal{L}'_{ADV}(\psi, \psi', \theta, w', b) \quad (9)$$

Here, $t \in \{1 \ldots T\}$ is the number of training samples.

The parameter θ, $w_{new}$, and b of the discriminator may be optimized by minimizing the same hinge loss as in (6):

$$\mathcal{L}_{DCS}(\psi, \psi', \theta, w', b) = \max(0, 1 + D(\hat{x}(t), y(t); \psi, \psi', \theta, w', b)) + \max(0, 1 - D(x(t), y(t); \theta, w', b) \quad (10)$$

In most circumstances, a fine-tuned generator may provide a result which is much more appropriate for a learning video sequence. Initialization of all parameters through a meta-learning step is also important. As found through experimentation, in such initialization, a talking head with a very high degree of reality is input first, and the neural network model according to the disclosure is thereby made to extrapolate and predict an image with a high degree of reality with respect to various head poses and facial expressions.

The generator network $G(y_i(t), \hat{e}_i; \psi, P)$ may be based on an image-to-image translation architecture suggested by Johnson, et al. [Reference 19], but downsampling and upsampling layers may be replaced by remaining blocks by instance normalization [References 2, 15, 36]. A person-specific parameter $\hat{\psi}_i$ performs the role as an affine coefficient of an instance normalization layer according to an adaptive instance normalization technology [Reference 14] known in the pertinent technical field, but a regular (non-adaptive) instance normalization layer of a downsampling block encoding a face landmark image $y_i(t)$ may still be used.

The embedder $E(x_i(s), y_i(s); \phi)$ and the ConvNet part $V(x_i(t), y_i(t); \theta)$ of the discriminator similarity network including remaining downsampling blocks (identical to those used in the generator but do not include normalization layers) may be used. The discriminator network has additional remaining blocks on its end compared to the embedder, and they may operate in a 4×4 space resolution. For acquiring vectorized outputs in both networks, global sum pooling for a spatial dimension may be performed prior to a rectified linear unit (ReLU).

Spectrum normalization [Reference 33] may be used for all convolutional and completely connected layers in all networks. Also, self-attention blocks [References 2, 42] may be used. They may be inserted in all downsampling parts of a network at a 32×32 space resolution, and in upsampling parts of a generator at a 64×64 resolution.

For calculation of $\mathcal{L}_{CNT}$, the $L_1$ loss may be evaluated between activation of a Conv1,6,11,20,29 VGG19 layer and a Conv1,6,11,18,25 VGGFace layer for actual and fake images. In the case of VGG19, a loss having a weight is $1 \cdot 10^{-2}$, and in the case of a VGGFace term, $2 \cdot 10^{-3}$ may be summed. For both of the networks, a caffe-trained version [Reference 17] may be used. In the case of $\mathcal{L}_{FM}$ activation after remaining blocks of each discriminator network and a weight identical to $1 \cdot 10^1$ may be used. Lastly, in the case of $\mathcal{L}_{MCH}$, the weight may be set as $8 \cdot 10^1$.

The minimum number of channels in a convolutional layer may, for example, be set as 64, and not only the size of an embedding vector N and also the maximum number of channels may, for example, be set as 512. Overall, an embedder may have fifteen million parameters, and a generator may have thirty-eight million parameters. A ConvNet part of a discriminator may have twenty million parameters. Using Adam [Reference 21], a network may be optimized.

The learning rates of an embedder and a generator network may be set as $5\times10^{-5}$ and $2\times10^{-4}$ in the case of a discriminator, and two update steps may be performed for the latter of each of the former [Reference 42].

It is not intended that the disclosure is limited by the aforementioned access method, values, and details, and this is because modification and correction of the aforementioned access method, values, and details may occur to those having ordinary skill in the pertinent technical field without any progressive effort. Accordingly, it is assumed that such modification and correction are within the range of the claims.

A method of synthesizing a talking head sequence for a random person using a generator network configured to map a head pose and a mimics descriptor with at least one image of a talking head sequence of a person in an electronic device may be provided according to the disclosure. The method may include performing few-shot learning of a generator network meta-learned with respect to a plurality of M video sequences including talking head images of people different from a random person and synthesizing a talking head sequence for a person using an unseen sequence prior to a fine-tuned generator network, a head pose, and a mimics descriptor $y_{NEW}(t)$.

Performing few-shot learning of a generator network meta-learned with respect to a plurality of M video sequences including talking head images of people different from a random person may include the following: receiving at least one video frame x'(t) from a single sequence of a frame of a person to which a talking head sequence will be synthesized; estimating a head pose and a mimics descriptor y'(t) for the at least one video frame x'(t); computing an embedding N-dimension vector ê characterizing person-specific information based on the at least one video frame x'(t) using a meta-learned embedder network; instantiating the generator network based on a parameter set of a meta-learned generator network and the embedding N-dimension vector ê; and fine-tuning the parameters of the generator network to be matched with the at least one video frame x'(t) based on the head pose and the mimics descriptor y'(t) being provided to the generator network. The parameter set of the meta-learned generator network may be input for a few-shot learning step, and the parameter set of the fine-tuned generator network may be output of the few-shot learning step.

The head pose and the mimics descriptors y'(t) and $y_{NEW}(t)$ may include face landmarks without limitation. The head pose and the mimics descriptor y'(t) may be used with at least one video frame x'(t) for computing the embedding N-dimension vector ê.

Meta-learning of a generator network and an embedder network may be performed in K-shot learning episodes, and here, K is a pre-defined integer and each episode may include the following: receiving at least one video frame x(t) from a video sequence among a plurality of M video sequences including talking head images of people different from a random person; estimating a head pose and a mimics descriptor y(t) for the at least one video frame x(t); computing an embedding N-dimension vector ê characterizing person-specific information based on the at least one video frame x(t); instantiating the generator network based on a parameter set of the current generator network and the embedding N-dimension vector ê; and updating a parameter set of the generator network and a parameter set of the embedder network based on match between output of the generator network for the estimated head pose and mimics descriptor y(t) and the sequence of the at least one video frame x(t).

The generator network and the embedder network may, for example, be convolutional networks. During the instantiating step, the normalization coefficient inside the instantiated generator network may be computed based on the embedding N-dimension vector computed by the embedder network. The discriminator network may be meta-learned together with the generator network and the embedder network, and the method may further include: computing a realism score r of output of the generator network using the discriminator network, and updating the parameters of the generator network and the embedder network based on the realism score r; and updating the parameters of the discriminator network for increasing the realism score r for a video frame among the plurality of M video sequences and decreasing the realism score r for the output (e.g., a synthesized image) of the generator network.

The discriminator network may be a projection discriminator network configured to compute the realism score r of the output of the generator network using an embedding N-dimension vector w different from the embedding N-dimension vector ê trained with respect to each video sequence of the plurality of M video sequences. The difference between the embedding N-dimension vector ê and the embedding N-dimension vector w may be penalized, and the projection discriminator may be used during the fine-tuning step, and the embedding N-dimension vector w of the projection discriminator may be initialized to the embedding N-dimension vector ê at the start of fine-tuning.

The aforementioned various embodiments of the disclosure may be performed by an electronic device. The electronic device according to the disclosure will be described in greater detail below with reference to FIGS. 5 and 6.

Figure 5:
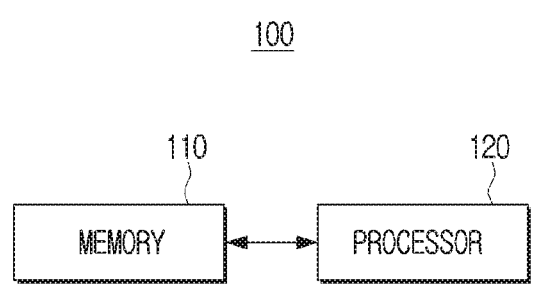
FIG. 5 is a block diagram illustrating an example configuration of an example electronic device according to an embodiment of the disclosure.

FIG. 5 is a block diagram illustrating an example configuration of an example electronic device according to an embodiment of the disclosure.

As illustrated in FIG. 5, the electronic device 100 according to the disclosure may include a memory 110 and a processor (e.g., including processing circuitry) 120.

The memory 110 may store at least one instruction regarding the electronic device 100. Also, the memory 110 may store an operating system (O/S) for driving the electronic device 100. In addition, the memory 110 may store various kinds of software programs or applications for making the electronic device 100 operate according to the various embodiments of the disclosure. Further, the memory 110 may include a semiconductor memory such as a flash memory or a magnetic storage medium such as a hard disk.

For example, in the memory 110, various types of software modules for making the electronic device 100 operate according to the various embodiments of the disclosure may be stored, and the processor 120 may include various processing circuitry and control the operations of the electronic device 100 by executing the various types of software modules stored in the memory 110. For example, the memory 110 may be accessed by the processor 120, and reading/recording/correction/deletion/update, etc. of data by the processor 120 may be performed.

In the disclosure, the term memory 110 may include the memory 110, a ROM (not shown) and a RAM (not shown) inside the processor 120, and/or a memory card (not shown) mounted on the electronic device 100 (e.g., a micro SD card, a memory stick).

For example, in the various embodiments according to the disclosure, in the memory 110, a neural network model according to the disclosure, and a module implemented to be able to implement the various embodiments of the disclosure using the neural network model may be stored. Also, in the memory 110, information related to algorithms for performing first learning and second learning according to the disclosure may be stored. In addition, in the memory 110, a plurality of video sequences according to the disclosure, various images, landmark information, and information on the parameters of the embedder, the parameters of the generator, and the parameters of the discriminator may be stored.

Other than the above, various kinds of necessary information within a range for achieving the purpose of the disclosure may be stored in the memory 110, and information stored in the memory 110 may be received from a server or an external device or updated as it is input by a user.

The processor 120 may include various processing circuitry and controls the overall operations of the electronic device 100. For example, the processor 120 may be connected with the components of the electronic device 100 including the aforementioned memory, and may control the overall operations of the electronic device 100 by executing at least one instruction stored in the aforementioned memory 110.

The processor 120 may be implemented in various ways. For example, the processor 120 may include various processing circuitry, such as, for example, and without limitation, at least one of an application specific integrated circuit (ASIC), an embedded processor, a microprocessor, a hardware control logic, a hardware finite state machine (FSM), a digital signal processor (DSP), a CPU, a dedicated processor, or the like. In the disclosure, the term processor 120 may include, for example, and without limitation, a central processing unit (CPU), a graphic processing unit (GPU), a main processing unit (MPU), etc.

For example, in the various embodiments according to the disclosure, the processor 120 may perform first learning according to a meta-learning method based on a plurality of learning video sequences and make a neural network model acquire a video sequence including a talking head of a random user. The processor 120 may perform second learning according to a few-shot learning method based on at least one image for a first user who is a new user not included in the plurality of learning video sequences and fine-tune the neural network model to be personalized for the first user, and acquire a video sequence including the talking head of the first user using the neural network model for which the first learning and the second learning were performed. As the various embodiments according to the disclosure were described above with reference to FIGS. 1, 2, 3, 4 and 5, overlapping explanation will not be repeated here.

Figure 6:
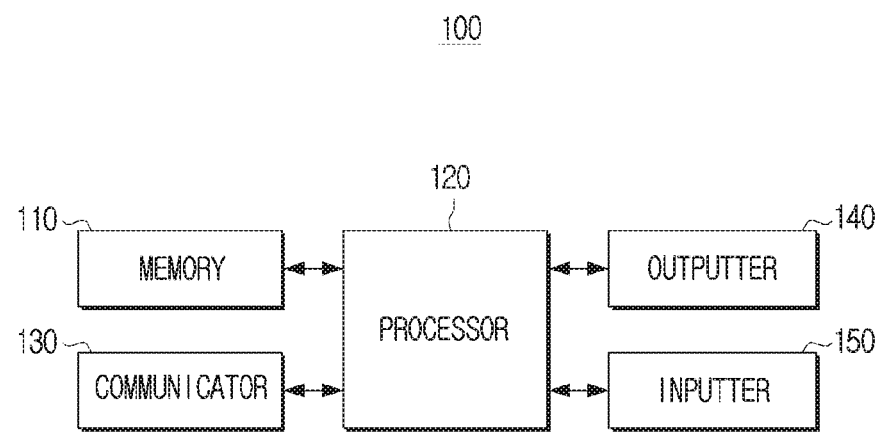
FIG. 6 is a block diagram illustrating an example configuration of an example electronic device according to an embodiment of the disclosure.

FIG. 6 is a block diagram illustrating an example configuration of an example electronic device according to an embodiment of the disclosure.

As illustrated in FIG. 6, the electronic device 100 according to the disclosure may not only include a memory 110 and a processor 120, but also further include a communicator (e.g., including communication circuitry) 130, an image sensor (not shown), an outputter (e.g., including output circuitry) 140, and an inputter (e.g., including input circuitry) 150. However, such components are merely examples, and in implementing the disclosure, new components may be added in addition to such components or some components can be omitted.

The communicator 130 may include various communication circuitry, and perform communication with an external device (e.g., including a server). For example, the processor 120 may receive various kinds of data or information from an external device connected through the communicator 130, and transmit various kinds of data or information to an external device. The communicator 130 may include various communication circuitry included in various communication modules, such as, for example, and without limitation, at least one of a WiFi module, a Bluetooth module, a wireless communication module, an NFC module, or the like.

For example, in the various embodiments according to the disclosure, the processor 120 may receive at least one image including the talking head of the first user from an external device through the communicator 130. The processor 120 may receive at least some of information related to algorithms for performing the first learning and the second learning according to the disclosure, a plurality of video sequences according to the disclosure, various images, landmark information, and information on the parameters of the embedder, the parameters of the generator, and the parameters of the discriminator from an external device through the communicator 130. The processor 120 may control the communicator 130 to transmit the first video sequence acquired according to the disclosure to an external device.

The outputter 140 may include various output circuitry, and the processor 120 may output various functions that the electronic device 100 can perform through the outputter 140. Also, the outputter 140 may include, for example, and without limitation, at least one of a display, a speaker, an indicator, or the like.

For example, in the various embodiments according to the disclosure, the processor 120 may control the display to display a video sequence or an image according to the various embodiments of the disclosure. For example, when the first video sequence including the talking head of the first user is acquired through the aforementioned process, the processor 120 may control the display to display the acquired first video sequence.

The inputter 150 may include various input circuitry, and the processor 120 may receive a user instruction for controlling the operations of the electronic device 100 through the inputter 150. For example, the inputter 150 may include various components including input circuitry, such as, for example, and without limitation, a microphone, a camera, a signal receiver, etc. The inputter 150 may be implemented as a form included in the display as a touch screen.

For example, in the various embodiments according to the disclosure, the camera may include an image sensor, and convert light that comes through a lens into an electronic image signal. The processor 120 may acquire an original image for a subject through the camera. The image sensor may be a charge coupled device (CCD) sensor or a complementary metal oxide semiconductor (CMOS) sensor, but is not limited thereto.

For example, according to an embodiment of the disclosure, the processor 120 may acquire at least one image including the talking head of the first user through the camera. When at least one image including the talking head of the first user is acquired, the acquired at least one image may be stored in the memory 110. The at least one image stored in the memory 110 may be used for at least one of the first learning or the second learning of the aforementioned neural network model by control of the processor 120, and may further be used in acquiring the first video sequence.

The method of controlling the electronic device 100 according to the aforementioned embodiments may be implemented as a program and provided to the electronic device 100. For example, a program including the controlling method of the electronic device 100 may be provided while being stored in a non-transitory computer readable medium.

For example, in a computer readable recording medium including a program executing the controlling method of the electronic device 100, the controlling method of the electronic device 100 may include: performing first learning for a neural network model for acquiring a video sequence including a talking head of a random user based on a plurality of learning video sequences including talking heads of a plurality of users, performing second learning for fine-tuning the neural network model based on at least one image including a talking head of a first user different from the plurality of users and first landmark information included in the at least one image, and acquiring a first video sequence including the talking head of the first user based on the at least one image and pre-stored second landmark information using the neural network model for which the first learning and the second learning were performed.

In the above, the electronic device 100 according to the disclosure, and a computer readable recording medium including a program executing the controlling method of the electronic device 100 were explained schematically, but this is only for omitting overlapping explanation, and the various embodiments regarding the controlling method of the electronic device 100 can be applied to the electronic device 100 according to the disclosure, and a computer readable recording medium including a program executing the controlling method of the electronic device 100.

According to the aforementioned various embodiments of the disclosure, the electronic device can efficiently and effectively train a neural network model which is capable of generating a video sequence including a talking head, and in accordance thereto, use a small amount of images of a user not included in learning data, and acquire a video sequence including a talking head with a high degree of reality of the user. Also, according to the disclosure, an uncanny valley effect is substantially removed from a generated video sequence, and a video sequence with high quality including a talking head which has a high degree of reality and is optimized for a specific user can be provided.

The electronic device 100 according to the disclosure may be an electronic device 100 such as, for example, and without limitation, a smartphone, a tablet, a PC, a laptop computer, or, for example, AR glasses, VR glasses, a smart watch, etc. However, the electronic device 100 is not limited thereto, and any electronic device which is capable of performing the processes including the first learning, the second learning, and acquisition of a video sequence according to the disclosure can be included in the electronic device 100 according to the disclosure.

Various methods, devices, and systems providing avatars with a high degree of reality may be implemented based on the aforementioned disclosure. Different methods, devices, and systems using models/networks trained to provide few-shot learning of talking head models with a high degree of reality and/or avatars with a high degree of reality may be generated based on the aforementioned disclosure. The various example embodiments of the disclosure may be implemented as non-transitory machine-readable media including computer-executable instructions that, when executed, cause an electronic device to perform the disclosed method of synthesizing a talking head model for a random person using an adversarial network when the instructions are executed by a processing unit of a device.

The disclosure may be implemented as a system for synthesizing a talking head model for a random person using an adversarial network. In such a system, operations of a method may be implemented as different function units, circuitry, and/or processors 120. However, any appropriate dispersion of functions among the different function units, circuitry, and/or processors 120 can be used without departing from the explained embodiments.

The various example embodiments of the disclosure may be implemented as any appropriate forms including hardware, software, firmware, or any combination thereof. The embodiments may be at least partially implemented as computer software executed selectively on at least one data processor 120 and/or digital signal processor 120. Elements and components of any embodiment may be implemented physically, functionally, and logically by any appropriate method. In practice, a function may be implemented as a single unit, a plurality of units, or a part of another generic-purpose unit.

The aforementioned descriptions of the embodiments of the disclosure are merely examples, and various modifications in configuration and implementation are considered to be within the scope of the disclosure, including the appended claims. For example, the embodiments of the disclosure are generally explained in relation to an example method, but such explanation is provided as examples. Although the disclosure was illustrated using language specific to structural characteristics or methodical operations, it should be understood that the appended claims are not necessarily limited to the aforementioned specific characteristics or operations. Rather, the aforementioned specific characteristics and operations are disclosed as example forms. The disclosure is not limited by the order of the steps of the suggested method, and the order may be modified by those having ordinary skill in the pertinent technical field without substantial effort. In addition, some or all of the operations of the method may be sequentially or simultaneously performed.

Each of the components according to the aforementioned various embodiments of the disclosure (e.g., a module or a program) may include a singular object or a plurality of objects. Among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner.

Operations performed by a module, a program, or other components according to the various embodiments may be executed sequentially, in parallel, repetitively, or heuristically. At least some of the operations may be executed in a different order or omitted, or other operations may be added.

The term "a part" or "a module" used in the disclosure includes a unit including hardware, software, or firmware, and it may be interchangeably used with terms, for example, logic, a logical block, a component, or a circuit. Also, "a part" or "a module" may be a component including an integrated body or a minimum unit performing one or more functions or a portion thereof. For example, a module may include an application-specific integrated circuit (ASIC).

The various embodiments of the disclosure may be implemented as software including instructions stored in machine-readable storage media, which can be read by machines (e.g., computers). The machines may refer, for example, to devices that call instructions stored in a storage medium, and can operate according to the called instructions, and the devices may include the electronic device (e.g., the electronic device 100) according to the embodiments described in the disclosure.

When the instructions are executed by the processor 120, the processor 120 may perform functions corresponding to the instructions by itself, or using other components under its control. An instruction may include a code that is generated by a compiler or a code executable by an interpreter.

A storage medium that is readable by machines may be provided in the form of a non-transitory storage medium. A, 'a non-transitory storage medium' is a tangible device, and may not include a signal (e.g., an electronic wave), and the term does not distinguish a case wherein data is stored semi-permanently in a storage medium and a case wherein data is stored temporarily. For example, 'a non-transitory storage medium' may include a buffer wherein data is temporarily stored.

According to an embodiment of the disclosure, the method according to the various embodiments described in the disclosure may be provided while being included in a computer program product. A computer program product is a product, and it can be traded between a seller and a buyer. A computer program product can be distributed in the form of a storage medium that is readable by machines (e.g., a compact disc read only memory (CD-ROM)), or distributed directly between two user devices (e.g.: smartphones) and on-line (e.g.: download or upload) through an application store (e.g.: Play Store™). In the case of on-line distribution, at least a portion of a computer program product (e.g., a downloadable app) may be stored in a storage medium readable by machines such as the server of the manufacturer, the server of the application store, and the memory 110 of the relay server at least temporarily, or may be generated temporarily.

Functions related to the neural network model according to the disclosure and functions related to artificial intelligence may be performed through the memory 110 and the processor 120.

The processor 120 may include one or a plurality of processors 120. The one or plurality of processors 120 may be generic-purpose processors such as, for example, and without limitation, a CPU, an AP, etc., graphic-dedicated processors such as a GPU, a VPU, etc., artificial intelligence-dedicated processors such as an NPU, or the like.

The one or plurality of processors 120 may perform control such that input data is processed according to pre-defined operation rules or an artificial intelligence model stored in the memory 110. The pre-defined operation rules or the artificial intelligence model are characterized in that they are made through learning.

The feature of being made through learning refer, for example, to pre-defined operation rules or an artificial intelligence model having desired characteristics being made by applying a learning algorithm to a plurality of learning data. Such learning may be performed in a device itself wherein artificial intelligence according to the disclosure is performed, or through a separate server/system.

An artificial intelligence model may include a plurality of neural network layers. Each layer may include, for example, a plurality of weight values, and performs an operation of a layer through an operation result of the previous layer and an operation of a plurality of weight values. As non-limiting examples of a neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), a generative adversarial network (GAN), a deep Q-network, or the like, and the neural network in the disclosure is not limited to the aforementioned examples excluding cases clearly specified.

A learning algorithm may refer, for example, to a method of training a specific subject machine (e.g., a robot) using a plurality of learning data and making the specific subject machine make a decision or make prediction by itself. As example of a learning algorithm, there are supervised learning, unsupervised learning, semi-supervised learning, or reinforcement learning, and the learning algorithm in the disclosure is not limited to the aforementioned examples excluding cases clearly specified.

While various example embodiments of the disclosure have been illustrated and described, the disclosure is not limited to the aforementioned embodiments, and it will be understood that various modifications may be made by those having ordinary skill in the technical field to which the disclosure belongs, without departing from the spirit and scope of the disclosure including the appended claims.

A list of references referred to above follows. It should be noted that the following references were referred to simply for explaining the disclosure, and are not intended to be interpreted as restricting or limiting the disclosure. Further, the following references are incorporated by reference herein in their entireties.

[1] O. Alexander, M. Rogers, W. Lambeth, J.-Y. Chiang, W.-C. Ma, C.-C. Wang, and P. Debevec. The Digital Emily project: Achieving a photorealistic digital actor. IEEE Computer Graphics and Applications, 30(4):20-31, 2010.

[2] K. S. Andrew Brock, Jeff Donahue. Large scale gan training for high fidelity natural image synthesis. arXiv: 1809.11096, 2018.

[3] A. Antoniou, A. J. Storkey, and H. Edwards. Augmenting image classifiers using data augmentation generative adversarial networks. In Artificial Neural Networks and Machine Learning—ICANN, pages 594-603, 2018.

[4] S. Arik, J. Chen, K. Peng, W. Ping, and Y. Zhou. Neural voice cloning with a few samples. In Proc. NIPS, pages 10040-10050, 2018.

[5] H. Averbuch-Elor, D. Cohen-Or, J. Kopf, and M. F. Cohen. Bringing portraits to life. ACM Transactions on Graphics (TOG), 36(6):196, 2017.

[6] V. Blanz, T. Vetter, et al. A morphable model for the synthesis of 3d faces. In Proc. SIGGRAPH, volume 99, pages 187-194, 1999.

[7] A. Bulat and G. Tzimiropoulos. How far are we from solving the 2d & 3d face alignment problem? (and a dataset of 230, 000 3d facial landmarks). In IEEE International Conference on Computer Vision, ICCV 2017, Venice, Italy, Oct. 22-29, 2017, pages 1021-1030, 2017.

[8] J. S. Chung, A. Nagrani, and A. Zisserman. Voxceleb2: Deep speaker recognition. In INTERSPEECH, 2018.

[9] J. Deng, J. Guo, X. Niannan, and S. Zafeiriou. Arcface: Additive angular margin loss for deep face recognition. In CVPR, 2019.

[10] C. Finn, P. Abbeel, and S. Levine. Model-agnostic metalearning for fast adaptation of deep networks. In Proc. ICML, pages 1126-1135, 2017.

[11] Y. Ganin, D. Kononenko, D. Sungatullina, and V. Lempitsky. Deepwarp: Photorealistic image resynthesis for gaze manipulation. In European Conference on Computer Vision, pages 311-326. Springer, 2016.

[12] I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pages 2672-2680, 2014.

[13] M. Heusel, H. Ramsauer, T. Unterthiner, B. Nessler, and S. Hochreiter. Gans trained by a two time-scale update rule converge to a local nash equilibrium. In I. Guyon, U. V. Luxburg, S. Bengio, H. Wallach, R. Fergus, S. Vishwanathan, and R. Garnett, editors, Advances in Neural Information Processing Systems 30, pages 6626-6637. Curran Associates, Inc., 2017. 6

[14] X. Huang and S. Belongie. Arbitrary style transfer in realtime with adaptive instance normalization. In Proc. ICCV, 2017.

[15] S. Ioffe and C. Szegedy. Batch normalization: Accelerating deep network training by reducing internal covariate shift. In Proceedings of the 32Nd International Conference on International Conference on Machine Learning—Volume 37, ICML'15, pages 448-456. JMLR.org, 2015.

[16] P. Isola, J. Zhu, T. Zhou, and A. A. Efros. Image-to-image translation with conditional adversarial networks. In Proc. CVPR, pages 5967-5976, 2017.

[17] Y. Jia, E. Shelhamer, J. Donahue, S. Karayev, J. Long, R. Girshick, S. Guadarrama, and T. Darrell. Caffe: Convolutional architecture for fast feature embedding. arXiv preprint arXiv:1408.5093, 2014.

[18] Y. Jia, Y. Zhang, R. Weiss, Q. Wang, J. Shen, F. Ren, P. Nguyen, R. Pang, I. L. Moreno, Y. Wu, et al. Transfer learning from speaker verification to multispeaker text-tospeech synthesis. In Proc. NIPS, pages 4485-4495, 2018.

[19] J. Johnson, A. Alahi, and L. Fei-Fei. Perceptual losses for real-time style transfer and super-resolution. In Proc. ECCV, pages 694-711, 2016.

[20] H. Kim, P. Garrido, A. Tewari, W. Xu, J. Thies, M. NieBner, P. Perez, C. Richardt, M. Zollh' ofer, and C. Theobalt. Deep video portraits. arXiv preprint arXiv: 1805.11714, 2018.

[21] D. P. Kingma and J. Ba. Adam: A method for stochastic optimization. CoRR, abs/1412.6980, 2014.

[22] S. Lombardi, J. Saragih, T. Simon, and Y. Sheikh. Deep appearance models for face rendering. ACM Transactions on Graphics (TOG), 37(4):68, 2018.

[23] S. O. Mehdi Mirza. Conditional generative adversarial nets. arXiv:1411.1784.

[24] M. Mori. The uncanny valley. Energy, 7(4):33-35, 1970.

[25] K. Nagano, J. Seo, J. Xing, L. Wei, Z. Li, S. Saito, A. Agarwal, J. Fursund, H. Li, R. Roberts, et al. paGAN: real-time avatars using dynamic textures. In SIGGRAPH Asia 2018 Technical Papers, page 258. ACM, 2018.

[26] A. Nagrani, J. S. Chung, and A. Zisserman. Voxceleb: a large-scale speaker identification dataset. In INTERSPEECH, 2017.

[27] 0. M. Parkhi, A. Vedaldi, and A. Zisserman. Deep face recognition. In Proc. BMVC, 2015.

[28] S. M. Seitz and C. R. Dyer. View morphing. In Proceedings of the 23rd annual conference on Computer graphics and interactive techniques, pages 21-30. ACM, 1996.

[29] Z. Shu, M. Sahasrabudhe, R. Alp Guler, D. Samaras, N. Paragios, and I. Kokkinos. Deforming autoencoders: Unsupervised disentangling of shape and appearance. In The European Conference on Computer Vision (ECCV), September 2018.

[30] K. Simonyan and A. Zisserman. Very deep convolutional networks for large-scale image recognition. In Proc. ICLR, 2015.

[31] S. Suwajanakorn, S. M. Seitz, and I. KemelmacherShlizerman. Synthesizing Obama: learning lip sync from audio. ACM Transactions on Graphics (TOG), 36(4):95, 2017.

[32] M. K. Takeru Miyato. cgans with projection discriminator. arXiv:1802.05637, 2018.

[33] M. K. Y. Y. Takeru Miyato, Toshiki Kataoka. Spectral normalization for generative adversarial networks. arXiv: 1802.05957, 2018.

[34] T. A. Tero Karras, Samuli Laine. A style-based generator architecture for generative adversarial networks. arXiv: 1812.04948.

[35] J. Thies, M. Zollhofer, M. Stamminger, C. Theobalt, and M. NieBner. Face2face: Real-time face capture and reenactment of RGB videos. In Proceedings of the IEEE Conference on Computer Vision and Pattern Recognition, pages 2387-2395, 2016.

[36] D. Ulyanov, A. Vedaldi, and V. S. Lempitsky. Instance normalization: The missing ingredient for fast stylization. CoRR, abs/1607.08022, 2016.

[37] T.-C. Wang, M.-Y. Liu, J.-Y. Zhu, G. Liu, A. Tao, J. Kautz, and B. Catanzaro. Video-to-video synthesis. arXiv preprint arXiv:1808.06601, 2018.

[38] T.-C. Wang, M.-Y. Liu, J.-Y. Zhu, A. Tao, J. Kautz, and B. Catanzaro. High-resolution image synthesis and semantic manipulation with conditional gans. In Proceedings of the IEEE Conference on Computer Vision and Pattern Recognition, 2018.

[39] Z. Wang, A. C. Bovik, H. R. Sheikh, and E. P. Simoncelli. Image quality assessment: From error visibility to structural similarity. Trans. Img. Proc., 13(4):600-612, April 2004.

[40] O. Wiles, A. Sophia Koepke, and A. Zisserman. X2face: A network for controlling face generation using images, audio, and pose codes. In The European Conference on Computer Vision (ECCV), September 2018.

[41] C. Yin, J. Tang, Z. Xu, and Y. Wang. Adversarial metalearning. CoRR, abs/1806.03316, 2018. 2

[42] H. Zhang, I. J. Goodfellow, D. N. Metaxas, and A. Odena. Self-attention generative adversarial networks. arXiv: 1805.08318, 2018.

[43] R. Zhang, T. Che, Z. Ghahramani, Y. Bengio, and Y. Song. Metagan: An adversarial approach to few-shot learning. In NeurIPS, pages 2371-2380, 2018.

What is claimed is:

1. A method of controlling an electronic device, comprising:
   performing first learning for a neural network model for acquiring a video sequence including a talking head of a random user based on a plurality of learning video sequences including talking heads of a plurality of users;
   performing second learning for fine-tuning the neural network model based on at least one image including a talking head of a first user different from the plurality of users and first landmark information included in the at least one image; and
   acquiring a first video sequence including the talking head of the first user based on the at least one image and pre-stored second landmark information using the neural network model for which the first learning and the second learning were performed,
   wherein the performing second learning comprises:
      acquiring the at least one image;
      acquiring the first landmark information based on the at least one image;

acquiring a first embedding vector including information related to an identity of the first user by inputting the at least one image and the first landmark information into an embedder of the neural network model for which the first learning was performed; and fine-tuning a parameter set of a generator of the neural network model for which the first learning was performed to be matched with the at least one image based on the first embedding vector.

2. The method of claim 1,
wherein the acquiring a first video sequence comprises:
acquiring the first video sequence by inputting the second landmark information and the first embedding vector into the generator.

3. The method of claim 1,
wherein the first landmark information and the second landmark information include information on a head pose and information on a mimics descriptor.

4. The method of claim 1,
wherein the embedder and the generator include a convolutional network, and
based on the generator being instantiated, acquiring normalization coefficients inside the instantiated generator based on the first embedding vector acquired by the embedder.

5. The method of claim 1,
wherein the performing first learning comprises:
acquiring at least one learning image from a learning video sequence including a talking head of a second user among the plurality of learning video sequences;
acquiring third landmark information for the second user based on the at least one learning image;
acquiring a second embedding vector including information related to an identity of the second user by inputting the at least one learning image and the third landmark information into the embedder;
instantiating the generator based on the parameter set of the generator and the second embedding vector;
acquiring a second video sequence including the talking head of the second user by inputting the second landmark information and the second embedding vector into the generator; and
updating the parameter set of the neural network model based on a degree of similarity between the second video sequence and the learning video sequence.

6. The method of claim 5,
wherein the performing first learning further comprises:
acquiring a realism score for the second video sequence through a discriminator of the neural network model;
updating the parameter set of the generator and the parameter set of the embedder based on the realism score; and
updating the parameter set of the discriminator.

7. The method of claim 6,
wherein the discriminator includes a projection discriminator acquiring the realism score based on a third embedding vector different from the first embedding vector and the second embedding vector.

8. The method of claim 7,
wherein, based on the first learning being performed, penalizing a difference between the second embedding vector and the third embedding vector, and
initializing the third embedding vector based on the first embedding vector at the start of the second learning.

9. The method of claim 1,
wherein the at least one image includes from 1 to 32 images.

10. An electronic device comprising:
a memory storing at least one instruction; and
a processor configured to execute the at least one instruction,
wherein the processor is configured to:
perform first learning for a neural network model for acquiring a video sequence including a talking head of a random user based on a plurality of learning video sequences including talking heads of a plurality of users,
perform second learning for fine-tuning the neural network model based on at least one image including a talking head of a first user different from the plurality of users and first landmark information included in the at least one image, and
acquire a first video sequence including the talking head of the first user based on the at least one image and pre-stored second landmark information using the neural network model for which the first learning and the second learning were performed,
wherein the perform second learning comprises:
acquire the at least one image,
acquire the first landmark information based on the at least one image,
acquire a first embedding vector including information related to an identity of the first user by inputting the at least one image and the first landmark information into an embedder of the neural network model for which the first learning was performed, and
fine-tune a parameter set of a generator of the neural network model for which the first learning was performed to be matched with the at least one image based on the first embedding vector.

11. The electronic device of claim 10,
wherein the processor is configured to:
acquire the first video sequence by inputting the second landmark information and the first embedding vector into the generator.

12. The electronic device of claim 10,
wherein the first landmark information and the second landmark information include information on a head pose and information on a mimics descriptor.

13. The electronic device of claim 10,
wherein the embedder and the generator include a convolutional network, and
based on the generator being instantiated, acquire normalization coefficients inside the instantiated generator based on the first embedding vector acquired by the embedder.

14. The electronic device of claim 10, wherein the processor is configured to:
acquire at least one learning image from a learning video sequence including a talking head of a second user among the plurality of learning video sequences,
acquire third landmark information for the second user based on the at least one learning image,
acquire a second embedding vector including information related to an identity of the second user by inputting the at least one learning image and the third landmark information into the embedder,
instantiate the generator based on the parameter set of the generator and the second embedding vector, acquire a second video sequence including the talking head of the second user by inputting the second landmark information and the second embedding vector into the generator, and update the parameter set of the neural network model based on a degree of similarity between the second video sequence and the learning video sequence.

15. The electronic device of claim 14,
wherein the processor is configured to:
acquire a realism score for the second video sequence through a discriminator of the neural network model, and update the parameter set of the generator and the parameter set of the embedder based on the realism score, and update the parameter set of the discriminator.

16. The electronic device of claim 15,
wherein the discriminator includes a projection discriminator acquiring the realism score based on a third embedding vector different from the first embedding vector and the second embedding vector.

17. The electronic device of claim 16,
wherein, based on the first learning being performed, penalizing a difference between the second embedding vector and the third embedding vector, and
the third embedding vector is initialized based on the first embedding vector at the start of the second learning.

18. A non-transitory computer readable recording medium having recorded thereon a program which, when executed by a processor of an electronic device causes the electronic device to perform operations comprising:

performing first learning for a neural network model for acquiring a video sequence including a talking head of a random user based on a plurality of learning video sequences including talking heads of a plurality of users;

performing second learning for fine-tuning the neural network model based on at least one image including a talking head of a first user different from the plurality of users and first landmark information included in the at least one image; and acquiring a first video sequence including the talking head of the first user based on the at least one image and pre-stored second landmark information using the neural network model for which the first learning and the second learning were performed, wherein the performing second learning comprises:
acquiring the at least one image;
acquiring the first landmark information based on the at least one image;
acquiring a first embedding vector including information related to an identity of the first user by inputting the at least one image and the first landmark information into an embedder of the neural network model for which the first learning was performed; and
fine-tuning a parameter set of a generator of the neural network model for which the first learning was performed to be matched with the at least one image based on the first embedding vector.

* * * * *